United States Patent [19]

Stoneham et al.

[11] Patent Number: 5,113,208
[45] Date of Patent: May 12, 1992

[54] MECHANICAL ADJUNCT FOR ELECTRICAL FILM DRIVE IN MAGNETIC DATA CAMERA

[75] Inventors: Jeffrey R. Stoneham, Spencerport; David C. Smart, Fairport, both of N.Y.

[73] Assignee: Eastman Kodak Company, Rochester, N.Y.

[21] Appl. No.: 620,424

[22] Filed: Nov. 30, 1990

[51] Int. Cl.⁵ .............................................. G03B 17/24
[52] U.S. Cl. .................................. 354/105; 354/173.1
[58] Field of Search ............ 354/105, 106, 170, 173.1, 354/76, 173.11

[56] References Cited

U.S. PATENT DOCUMENTS

| | | | |
|---|---|---|---|
| 1,704,789 | 1/1921 | Chamberlin | 354/171 |
| 2,674,009 | 4/1954 | Williams | 18/59 |
| 3,005,377 | 10/1961 | Brault et al. | 354/204 |
| 3,008,371 | 11/1961 | Braut et al. | 354/204 |
| 3,404,614 | 10/1968 | Naumann | 354/170 |
| 4,180,315 | 12/1979 | Nozawa et al. | 354/170 |
| 4,588,274 | 5/1986 | Kazumi | 354/105 |
| 4,613,911 | 9/1986 | Ohta | 360/3 |
| 4,693,579 | 9/1987 | Alfredsson et al. | 354/173.1 |
| 4,973,996 | 11/1990 | Harvey | 354/106 |
| 4,987,431 | 1/1991 | Harvey | 354/173.1 |

Primary Examiner—L. T. Hix
Assistant Examiner—David M. Gray
Attorney, Agent, or Firm—Roger A. Fields

[57] ABSTRACT

An electrical drive motor system for a camera having a read head for reading magnetically encoded data from a filmstrip during a reel-to-reel transport of the film, includes a mechanism for storing energy in a mechanical motor spring. The energy stored in the spring is used to temporarily continue or complete the advance of the film with the electric motor shut off, to allow the read head to operate without electromagnetic interference from the electric motor.

20 Claims, 4 Drawing Sheets

MECHANICAL ADJUNCT FOR ELECTRICAL FILM DRIVE IN MAGNETIC DATA CAMERA

TECHNICAL FIELD

This invention relates generally to improvements in an electrical film transport system of a camera having the ability to read/write data magnetically encoded on photographic film; and, more particularly, relates to an apparatus and method for supplementing an electric motor drive of such a camera with a self-winding mechanical film transport means that can be activated during a read/write cycle to minimize unwanted electromagnetic interference from the electric drive motor.

BACKGROUND ART

It is known to record data marginally on a photographic film strip in correspondence with the film frames to which the data relates, and to coordinate the reading/writing of said data with the operation of an electric motor drive film transport mechanism. The data may, for example, be marginally encoded by optical means adjacent a frame at the time of exposure and relate to exposure parameters for later reference in producing prints from the developed negatives. An electric drive may be configured to delay the frame-to-frame advance of the film following exposure, until the data recording cycle is complete. See, e.g., Kazumi U.S. Pat. No. 4,588,274 and Harvey U.S. Pat. No. 4,973,996.

The provision of a magnetic recording track on a still camera roll film for the purpose of storing various frame specific fiducials relating to image exposure (such as the photographic day, exposure conditions, photographic place, photographer, data for photographic laboratory use, and the like) is disclosed in Ohta U.S. Pat. No. 4,613,911. Ohta suggests the use of such track as a recording medium for providing the camera with information regarding film sensitivity, or the number of exposed or unexposed frames. Williams U.S. Pat. No. 2,674,009 shows the use of marginal magnetic cue marks in the form of microscopically thin metal disks which can be detected by magnetic scanning heads for the purpose of instituting an event or series of events (control or variation of printing light intensity, etc.) when a predetermined point or points are reached during the course of travel of a motion picture film.

Harvey U. S. Pat. No. 4,987,431, issued Jan. 22, 1991, disclosed the use of magnetically prerecorded frame correlated data for accomplishing the frame-to-frame film transport metering and registration procedure between exposures. A magnetic read head acts to read frame-specific identifying cues spaced in frame length intervals magnetically prerecorded along a magnetic medium which extends lengthwise along one edge of the film. Film recording and registration is established by controlling an electric drive motor in accordance with data read from the medium by a read head during the film transport process. A microcomputer act to compare the identification number of a frame nearest the aperture station with the previously stored identification number of the desired next exposure frame to assure their identity. If they are not the same, the microcomputer activates the electric motor of the film transport drive to adjust the frame position to ensure correct registration of the desired next available exposure.

In gathering film resident, magnetically recorded data from a film strip during film transportation (such as the gathering of film speed, mid roll interrupt, etc. information during a film prewinding load cycle), a problem may exist where electromagnetic interference occurs during execution of the magnetic read command. The potential for electromagnetic interference is especially great if the electric drive motor is placed physically close to the magnetic read head in the camera. One approach to alleviate this problem is to use magnetic shielding to separate the read/write elements from the potential source of interference. It is desirable to find an alternative approach to addressing this problem that eliminates totally the source of interference during the read process.

DISCLOSURE OF THE INVENTION

The invention provides an electrical film transport drive motor system for a camera having the ability to read and/or write data magnetically encoded on photographic film, such as the ability to read prerecorded data relating to film speed, number of exposures, etc. during a prewind film loading step in a still camera. In accordance with the invention, provision is made for automatically storing energy in an auxiliary mechanical motor drive mechanism during operation of the electric motor drive, so that mechanical drive can be controllably engaged when the read/write cycle is initiated, to momentarily continue or complete the advance of the film, without interruption and without electromagnetic interference from the electric drive motor.

In a preferred embodiment disclosed in greater detail below, means is provided during operation of the electric drive motor for storing energy in a mechanical motor spring, for coordination with a magnetic read/write head, so that film transport control is transferred from electric drive to mechanical drive when the read/write head is activated.

In one form, the electric motor is configured so that it energizes the mechanical drive spring with sufficient energy so that the entire remaining roll of film can be prewound mechanically, once the magnetic read/write process is begun. The "on" duty cycle for the electric motor can be programmed to effect the sharing of film drive responsibility, as desired, between the electrical and mechanical film drive components.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

MODES OF CARRYING OUT THE INVENTION

The principles of the apparatus and method of the invention are described with reference to an exemplary implementation of a motorized film transport drive mechanism in a still film camera having means for reading marginally magnetically recorded data from a film strip F. As shown, the strip F has a plurality of image frames n−1, n, n+1, etc., and a corresponding plurality of frame specific, film-resident identifying fiducials exp n−1, exp n, exp n+1, etc., respectively correlated with the frames to identify the respective exposure numbers of the frames, spaced at periodic intervals along the strip. The film F may also be provided at some location marginally of the film with general data, such as film speed, first available exposure frame, etc., relating to the status of the film as a whole and not to any particular frame.

Figure 1:
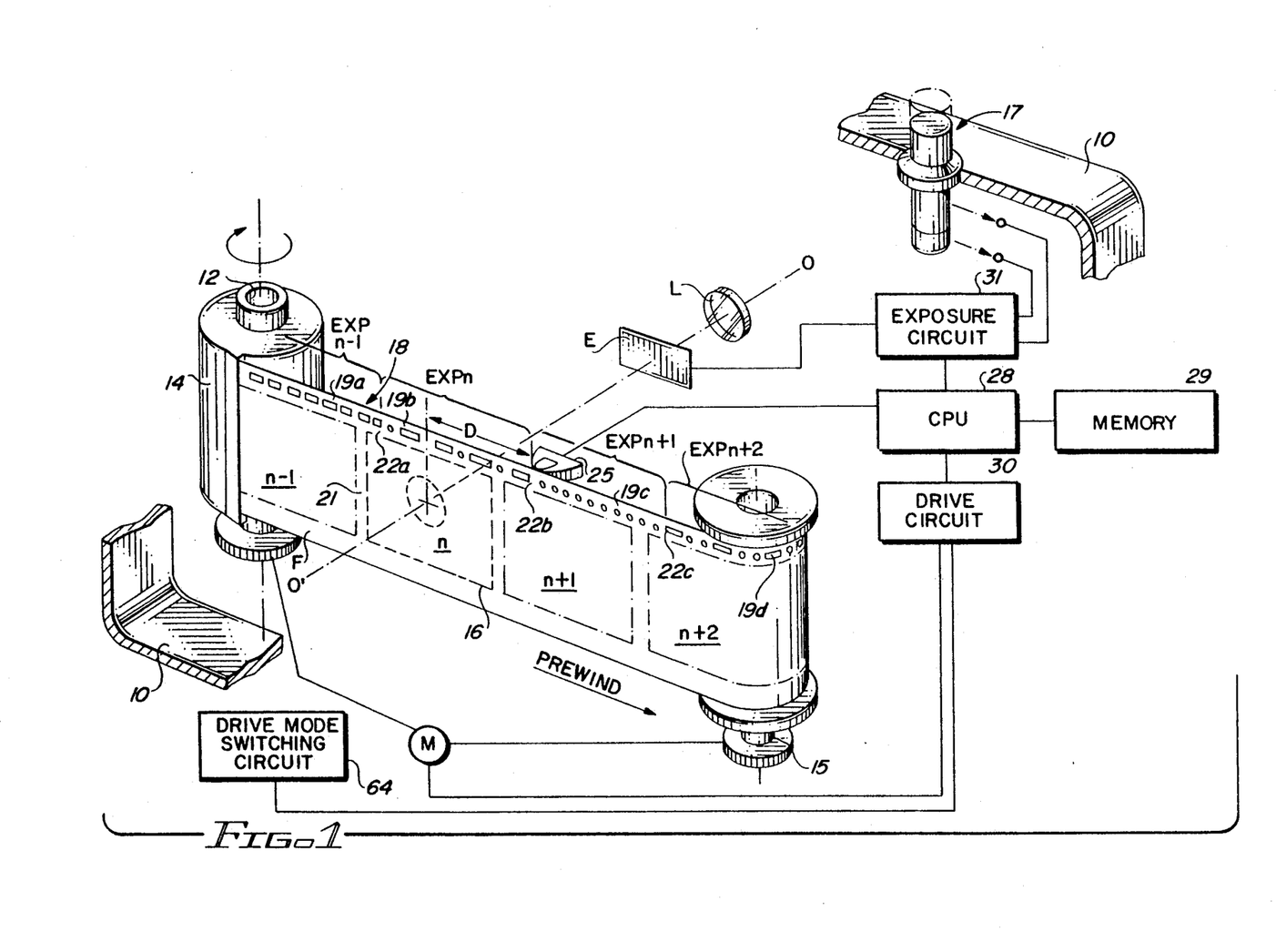
FIG. 1 is a schematic view of a still camera having the ability of reading film-resident magnetically encoded data and which is equipped with an automatic film transport drive mechanism in accordance with the invention.

As shown in FIG. 1, the film F is loaded in a light-proof body 10 of the still camera for movement between a supply reel 12 located in a film cartridge 14 and a take-up reel 15 spaced laterally therefrom across an exposure station or window 16, shown in dashed lines. The station 16 is located in alignment with an optical axis O—O', so that when a frame n of the film F is positioned in registration with the station 16 it can be exposed by light passing from a subject to be photographed through a lens L when an exposure gate E is actuated, such as in response to full depression of a shutter release button 17.

The film F may be of a single or multiple perforation per frame type with the camera outfitted in customary manner with a perforation sensor for controlling the frame-to-frame metering and registration, from exposure-to-exposure, of the film F. Alternatively, the camera may instead be outfitted with a mechanism as disclosed in Harvey U. S. patent application Ser. No. 07/457,467, wherein the frame-to-frame advance of a perforationless film F between exposures is controlled directly by registration fiducials incorporated magnetically within the prerecorded marginal magnetic data strip.

For the illustrative embodiment described here, the film F is considered in connection with a camera in which the film F undergoes a prewind step. This involves transporting the film strip F to unload it from supply reel 12 onto take-up reel 15, at least until the next desired unexposed frame N is brought into alignment with the optical axis O—O', before a next exposure. The data marginally magnetically preencoded on the strip F is read during the prewind step, to identify camera control parameters such as film speed, total number of unexposed frames, next unexposed frame, and the like. The principles of the invention are, thus, applicable not only to read data magnetically prerecorded at the factory during film manufacture, but also to read data prerecorded by the same or another camera during previous usage of the same film strip F (viz. during resumption of usage after mid-roll interrupt).

It is evident that the principles of the invention are likewise applicable both to systems wherein unexposed frames are prewound and returned to the cartridge after exposure, and to systems wherein no prewind is performed and unexposed frames are maintained within the cartridge pending exposure. The film transport mechanism described below controls the transport of the film F in both the prewind (movement from reel 12 to reel 15) and next available exposure advance (movement from reel 15 to reel 12) directions.

As shown in FIG. 1, the film strip F has a magnetic recording layer or strip 18 applied to at least one edge surface thereof in the longitudinal direction of the film strip F. The strip 18 is prerecorded at frame length intervals 19 along film F with magnetically encoded data in binary form corresponding to the sequential frame numbers exp n−1, exp n, exp n+1 of the respectively adjacent successive image frames n−1, n, n+1, etc. For the embodiment, it is preferable that the prerecorded data be a usual identifiable numerical sequence such as 1, 2, 3, 4, etc. However, it is enough that the frame identifying data be sufficiently frame specific so that a particular frame in a given plurality of frames can be separately identified from adjacent frames in the same plurality.

For the example shown in FIG. 1, image frame n−1 is identified by a marginal recording exp n−1 (shown as a series of dashes) recorded along a length interval 19a of the film F corresponding to the length of frame n−1, plus an associated desired marginal spacing increment 21. A neighboring strip portion 19b to the right of portion 19a has data exp n recorded thereon (shown as a series of alternating dots and dashes) for a frame length correlated with the frame n shown located in registration with the exposure station 16. To the right of the data exp n for the frame n is located data exp n+1 (shown as a series of dots) prerecorded in a frame length 19c correlated with the frame n+1. This scheme is continued at a frame length interval 19d for frame n+2, and so on for successive frames in a given plurality of frames, preferably for the entire length of exposable film, each fiducial location being recorded with a fiducial that is specific to identify and distinguish a particular frame in the plurality. If the camera employs a frame registration and metering system such as described in Harvey U. S. Pat. No. 4,987,431, frame registration film transport stop point identifiers or flags 22 can be either separately recorded or incorporated within the code format of the prerecorded frame numbers themselves in accordance with known computer related magnetic media drive technology. Further, the film strip F may include magnetically prerecorded data located at a leading or trailing edge of the film F on the track 18, which includes general information such as film speed, next exposure frame number, etc.

For the shown embodiment, a magnetically prerecorded data sensor in the form of a magnetic read head 25 is positioned within the camera body 10 at a location to be in a data reading position adjacent the magnetic strip 18 when the roll film F is loaded. Circuitry, including a microcomputer 28 and a memory 29, is electrically interfaced with the sensor 25 and with a film transport drive assembly which comprises a bidirectional drive mechanism M, as more fully detailed below. The mechanism M is connected for control by a drive circuit 30 and is mechanically coupled to drive the reels 12 and/or 15 to advance or retrieve the film F either for the entire length of the film during prewind/rewind or in the frame-to-frame advance from an exposed frame n toward a next unexposed frame n+1 (the latter, e.g., occurring in response to an exposure completion signal received by the microcomputer 28 from an exposure circuit 31).

The apparatus of the camera may, optionally, include a separate write head (not shown) either in combination at the same location with sensor 25, or at another location spaced a known distance therefrom. The write head may be used, for example, to record exposed frame specific data either on the same track 18 or at another location on the film F. The write head can also be used for recording general information, such as the number of the last exposed frame (or number of the next unexposed frame) of a film whose use is interrupted prior to full exposure of all available frames.

In accordance with the invention, the film transport system includes an electric drive motor, augmented by means responsive to the operation of the electric drive motor for storing and redelivering mechanical drive energy. The stored mechanical energy is controllably released to assume the primary film drive function from the electric motor, at least during periods when the read head 25 is engaged in the reading of the magnetically prerecorded data. In systems utilizing the principles of the invention, which provide also for a write head for writing data in magnetically recorded form onto the film strip, the drive mechanism can be likewise configured to transfer control of film transport from electrical to mechanical drive during execution of a data write cycle.

Figure 2:
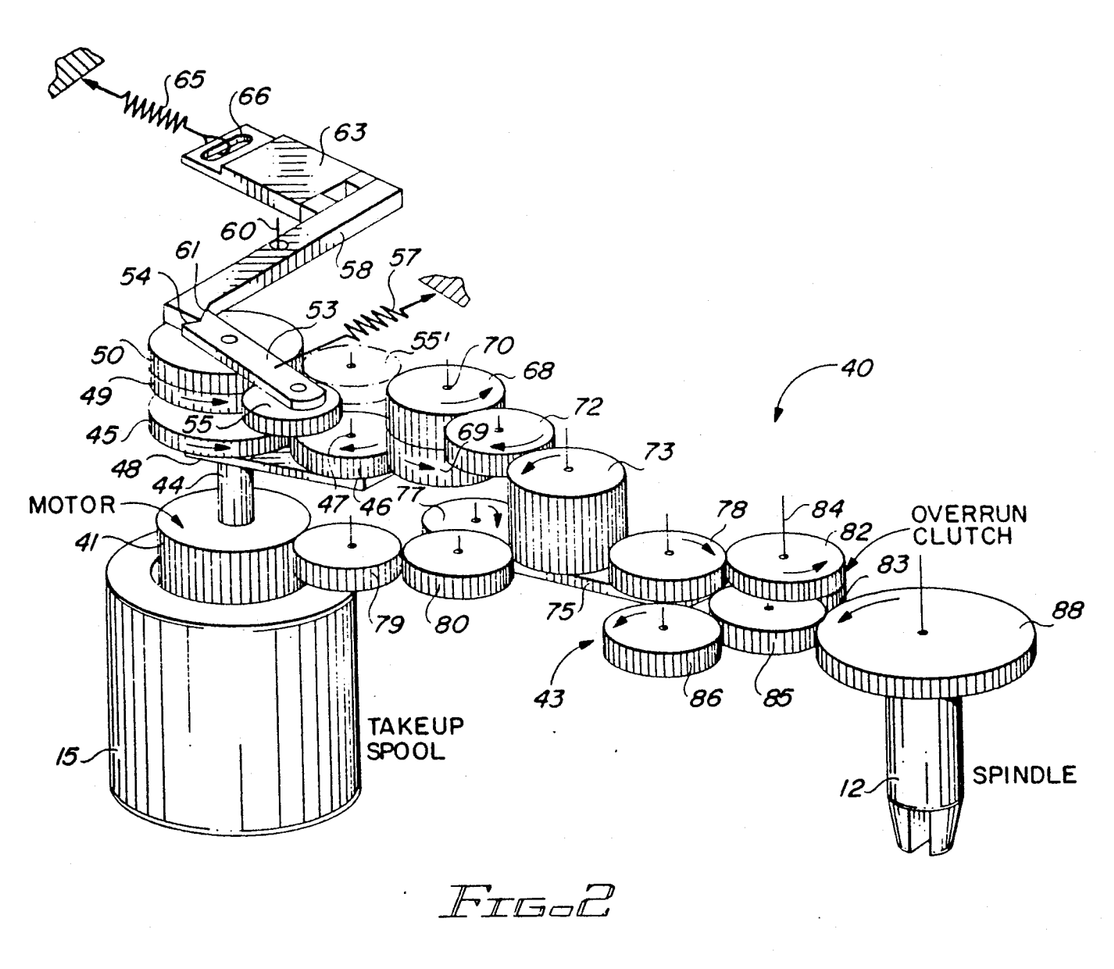
FIG. 2 is a schematic perspective view showing details of a film drive mechanism usable with the camera embodiment of FIG. 1.
Figures 3, 4:
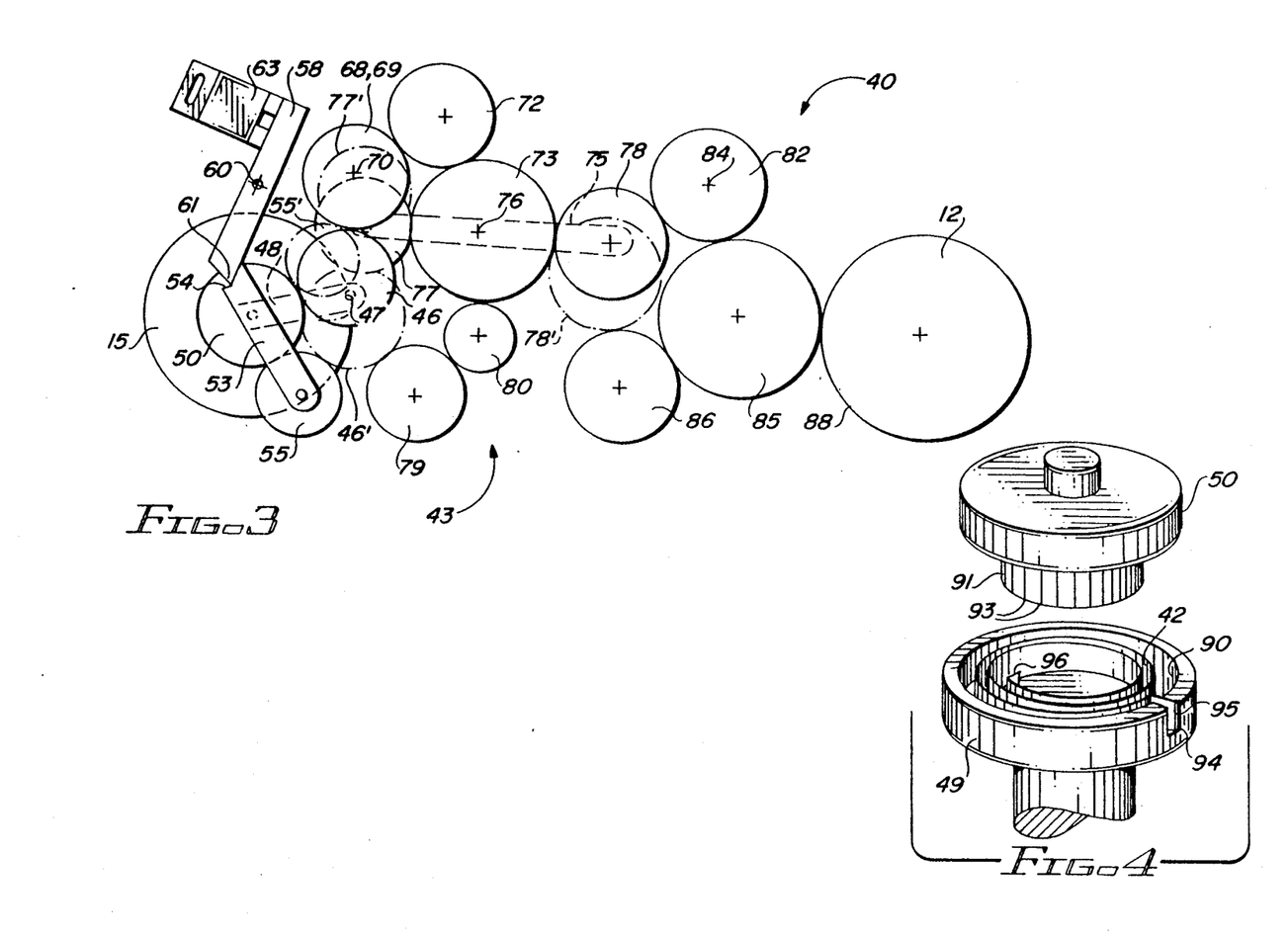
FIG. 3 is a schematic top view of the apparatus of FIG. 2.
FIG. 4 is an enlarged exploded view of a portion of the apparatus of FIGS. 2 and 3.

Apparatus suitable for performing the film drive function of the mechanism M of FIG. 1, in accordance with the invention, is shown in FIGS. 2-4.

As shown in FIGS. 2-4, the camera includes a film transport system 40 provided within the camera body 10 for the purpose of handling the transportation of film strip F between supply reel 12 and take-up reel 15 across the exposure plane.

An electric motor 41 is mounted on the camera body 10 for transport of the film between a spindle 12 and a take-up spool 15. The electric motor 41 is mounted on the body 10 connected to wind a spring 42 (FIG. 4) and to motivate a gear train 43 in a manner described below. A main drive shaft 44 of the motor 41 carries a pinion 45 which meshes with an idler gear 46 mounted for free pivotal rotation about an axis 47 at the distal end of an elongated arm 48 whose proximal end is journalled for free rotation about the axis of the shaft 44. A spring housing gear 49 is mounted coaxially at the terminal upper end of the shaft 44 for rotation therewith. A gear 50 depends coaxially into position directly above gear 49 from a transversely extending swing arm 53 which is mounted on the body 10 for free pivotal rotation of an intermediate portion thereof about an axis coincident with the shaft axis. A proximal end of the arm 53 is provided with a notch 54, and a distal end of the same arm 53 carries an idler gear 55 for free rotation thereon in mesh with gear 50, as shown. Gear 55 is axially-spaced above gear 47, with respect to the axis of shaft 44. Means, such as a spring 57 connecting the distal end of arm 53 to the camera body 10, serves to bias the arm 53 in a counterclockwise direction (as viewed in FIG. 3) into a position 55' of meshing engagement between gear 50 and gear 70, as described further below (shown in dot-dashed lines in FIGS. 2 and 3).

A latch arm 58 is rotatably secured within the body 10 for rotation about a fixed pivot point journalled connection 60. Latch arm 58 includes a tooth 61 at its proximal end which is configured for locking engagement with the notch 54 of the arm 53, to maintain the arm 53 in the solid line position shown against the bias of spring 57. The opposite end of the latch arm 58 includes a slug 63 of ferromagnetic material which serves as the movable core of a solenoid-operated drive mode switching mechanism 64 (FIG. 1). The mechanism 64 is configured to react with slug 63 to cause a pivoting in the clockwise direction about the axis of the pivot point 60 of the latch arm 58. Means, such as a spring 65 attached between the body 10 and a slot 66 formed on an extension beyond the slug 63 of the latch arm 58, serves to bias the latch arm 58 in the counterclockwise direction.

The gear train 43 further includes coaxial, axially-spaced gears 68, 69 journalled for free rotation about a common axis point 70 fixed within the body 10. The gear 68 is located so that the gear 55 is brought into meshing engagement with gear 68, when the gear 55 is moved from its solid to its dot-dashed position 55', as shown. The gear 69 is located so that the gear 46 is able to mesh with both gears 45 and 69, when arm 48 is rotated in the counterclockwise direction.

The train 43 also includes a plurality of other intermeshing gears, as shown. A gear 72 is mounted in circumferential tangential relationship relative to gear 68 for meshing therewith, and another gear 73 is mounted in circumferential tangential relationship for meshing engagement with gear 72. A further swing arm 75 has a central portion mounted for pivotal movement relative to the body 10 about a rotational axis provided by a pivotal connection 76, which also serves as the shaft for the gear 73. Idler gears 77, 78 are respectively mounted for rotation about points of connection to opposite ends of the arm 75, with the gears 77, 78 each being in meshing engagement with the gear 76. A gear 79 is fixed for rotation on the camera body 10 in meshing engagement with a gear 80, the gear 80 being likewise rotatably mounted on the body 10 in meshing engagement with the gear 76.

Proximate the gear 78 are located laterally-spaced coaxial gears 82, 83 for rotation about a fixed axis 84 established with respect to the body 10. The gear 82 is configured to be in circumferential tangential mesh with the gear 78 when the arm 75 is rotated in the counterclockwise direction to the solid line position shown. The gear 83 is located below gear 82, and is configured to act in cooperation therewith to form an overrun clutch mechanism. Gear 83 is located in mesh with another gear 85 fixed for rotation within the camera body 10, and the gear 85 is configured to mesh with another gear 86, as shown. The gear 85 is in circumferential engagement with a circumferential portion 88 of the spindle 12.

The lower element 49 of the gear pair 49, 50 (see FIG. 4) interacts with the gear 50 during rotation of the shaft 44 in the counterclockwise direction to wind the coilspring 42 for storing mechanical energy in the drive mechanism 40 during activation of the electric motor 41. The element 49 is internally recessed to provide an upwardly-opening, circular cavity 90 within which the spring 42 is located. The element 50 includes a central depending circular projection 91 having a plurality of teeth 93 located at evenly, angularly-spaced positions circumferentially thereof. The wall of the element 49 includes a slot 94 within which an outer angled end 95 of the coilspring 42 is secured. The opposite, inside angled end 96 of the spring 42 rides against the circumferential toothed surface of the projection 92 of the upper gear 50. A relationship is established between the end 96 and the teeth 93 so that as the shaft 44 is rotated in the counterclockwise direction, the end 96 will be maintained in fixed position against one of the teeth 93 for energizing the spring 42, until a predetermined torque is established. Thereafter, the end 96 will be caused to slip from tooth to tooth about the circumference of the projection 92, thus providing overtorque protection.

In operation, the swing arm 53 and gear 55 carried thereby are initially locked in the solid line position shown by engagement of the tooth 61 of the latch arm 58 in the notch 54 of the swing arm 53. For initiation of the film transport cycle, such as for prewinding the film F, the electric motor 41 is activated to move the shaft 44 in the counterclockwise direction. This rotates gears 45 and 49 with shaft 44, likewise in the counterclockwise direction, as indicated by the arrows. As the electric motor 41 continues to turn the shaft 44 in this manner, rotation of gear 49, which retains the end 95 of the coilspring 42, acts relative to the nondriven gear 50, to wind up the mechanical drive spring 42. The clutching arrangement provided between the teeth 93 and the inside end 96 of the spring 42, limits the maximum mechanical energy stored in the spring to a preestablished torque value. Further rotation of the element 49 relative to the element 50, once the spring 42 has reached its maximum torque value, will cause the end 96 to slip from tooth 93 to tooth 93 relative to the circumference 92 of the element 50.

With the shaft 44 thus rotating in the counterclockwise direction, the main drive gear 45 urges the therewith meshed idler gear 46, mounted on arm 45, into meshing contact with the circumferential periphery of gear 69, thus rotating the gear 69 in like counterclockwise direction, as indicated by action of the shaft 44 acting through the gears 45, 46. Rotation of the gear 69 about the axis 70 causes simultaneous, like rotation of gear 68 which is fixed for rotation on the same shaft 70. The counterclockwise rotation of gear 68 then causes likewise counterrotation of the gear 73, through the intermediary of the gear 72 which is fixed in the camera body 10 for rotation in mesh with both the gears 68 and 73. The counterclockwise rotation of gear 73 in mesh with gear 78, pivotally mounted on the arm 75, urges the arm 75 in the counterclockwise direction with gear 78 rotating in the clockwise direction in mesh with gear 82, as indicated. This, in turn, rotates the gear 83, through the medium of the clutching mechanism established with gear 82, to drive the gear 85 and the surface 88 to turn the spindle 12 to move the film F in the prewind direction indicated in FIG. 1.

The same rotation in the counterclockwise direction of the gear 73, brought about as described above, simultaneously urges the gear 77 into meshing engagement with the circumferential periphery of the take-up reel 15, to thereby drive reel 15 in the same direction in synchronism with the spindle 12. Because of the differences in diameter of their respective film receiving portions, the take-up reel 15 is caused to rotate faster than the spindle 12. Proceeding as described will cause the film F to be prewound from the spindle 12 onto the take-up reel 15, with the primary motor force being supplied exclusively by the electric motor.

In accordance with the invention, the described arrangement can be used to release the mechanical energy stored in the coilspring 42, so that the role of prime mover can be transferred from the electric motor 41 to the wound coilspring 42, whenever the read head 25 is engaged in a read cycle. The occurrence of a read cycle can be signalled by the CPU 28 (see FIG. 1) to the drive circuit 30, to send an appropriate signal to the solenoid circuit 63. Alternatively, the electric motor signal and circuit 63 signals can be coordinated be monitored using hard-wired NAND-gate or other binary logic circuitry, applying well-known techniques.

When a read cycle signal is initiated by CPU 28 during the prewind step, so that prerecorded information can be read from the film strip F, the CPU 28 directs the drive circuit 30 to switch the electric motor 41 off. Simultaneously, a signal is given either energizing or deenergizing the solenoid circuit 63 (depending on the configuration). The signal passed to the solenoid circuit 63 functions to move the slug 63 end of the swing arm 58 to cause pivoting of the arm 58 in a clockwise direction about the axis 60. This rotation removes the tooth 61 on the non-slug end of the arm 58 out of engagement with the recess 54 of the arm 53. Thus released from its locked position, the arm 53 is rotated counterclockwise under the biasing action of the spring 57 (FIG. 2) to bring the gear 55 to the dot-dashed position 55', shown in FIGS. 2 and 3. This brings gear 55 into mesh with gear 68 from its freely rotating solid line position. Thus engaged, gear 68 can now be rotated by the counterclockwise rotation of the gear 50 that occurs due to the unwinding of the coilspring 44, when the position of the gear 49 is made fixed by stopping the movement of the shaft 44 when the operation of electric motor 41 ceases. Gear 68 thus continues to rotate in the same previously established counterclockwise rotation direction when the motor 41 is turned off; however, instead of being motivated by gears 45, 46 and 69, the gear 68 is now motivated by the gears 50, 46 under the unwinding action of the coilspring 42.

The transport of the film F, thus, continues unimpeded in the same direction as before, under the action of the stored mechanical energy, while the motor 41 is turned off and the read cycle is active. The cessation of motor 41, however, removes motor 41 as a potential source of electromagnetic interference with operation of the read sensor 25. The gear 50 revolves in the counterclockwise direction under the stored energy of the spring 42 to turn the gear 55 (now in its dot-dashed 55' position) in mesh with the gear 68. The gear 68 continues to turn the gears 72, 73, as before. Rotation of gear 73 continues to urge gear 78 in rotation against gear 82, which in turn rotates the gears 83, 85 to rotate the spindle 12, as before. Likewise, the same swing arm 75 continues to urge the gear 77 into mesh with the take-up reel 15, likewise continuing the rotation of the take-up reel 15, as before.

After prewind, and for actuation of the film transport mechanism to effect the frame-to-frame advance between exposures, the shaft 44 of the electric motor 41 will be caused to rotate in the opposite direction. The opposite rotation serves to reset the swing arm 53 because of the intermesh between the gears 50, 55, with the biasing action exerted on the arm 58 causing the tooth 61 to be brought back into engagement with the notch 54. The same reversal of direction causes the arm 48 to rotate in the clockwise direction, bringing the gear 46 out of mesh with the gear 69, and into the dot-dashed position 46' in mesh with the gear 79 (see FIG. 3). With the shifting of the swing arms 53, 48 thus effected, the drive path will now be from the electric motor shaft 44 through the gears 45, 46, 79, 80, 73, 78, 86, 85 and 88 to rotate the spindle in the opposite direction for retrieving the film from the take-up reel 15 into the cartridge mounted on the spindle 12, during the frame-to-frame advance after each exposure. The opposite rotation effected on the gear 73, urges the swing arm 75 in a clockwise direction, so that gear 77 is shifted to the dot-dashed position 77' (FIG. 3) out of engagement with the take-up reel 15, and gear 78 is shifted to the dot-dashed position 78' into engagement with the gear 86.

Figure 5:
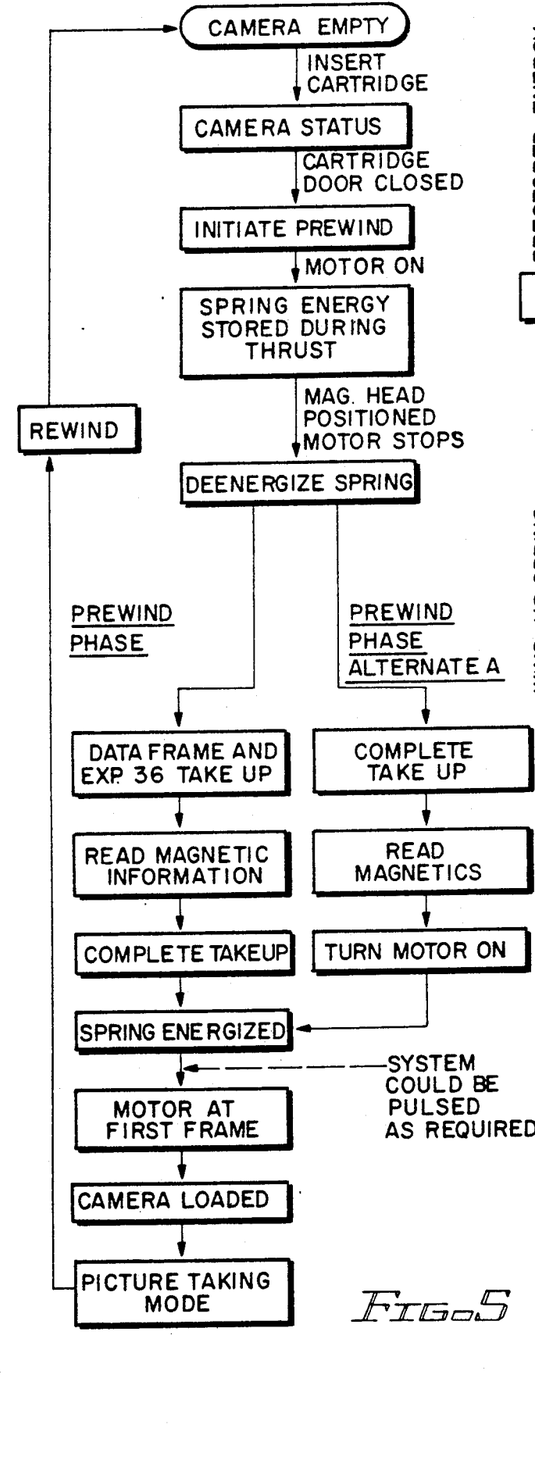
FIG. 5 is a flow diagram of the steps of a program usable in implementing the embodiment of FIGS. 1-4.
Figure 6:
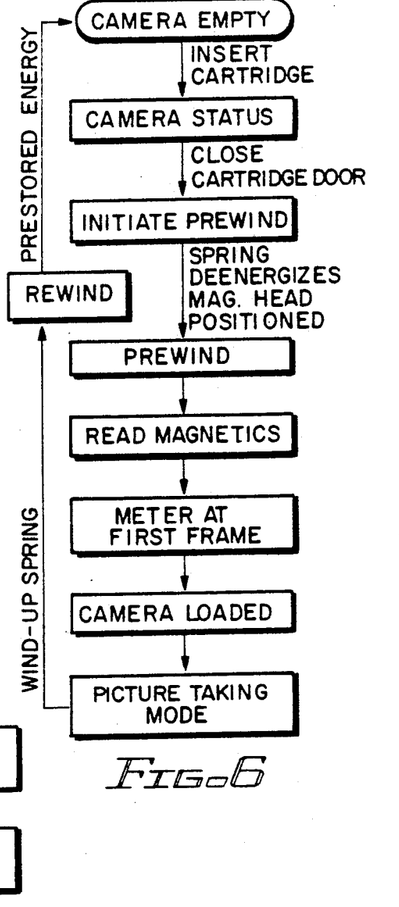
FIG. 6 is a flow diagram of the steps of an alternative program to that of FIG. 5.

FIG. 5 shows a flow diagram of the steps in an exemplary utilization of spring energy to transport the film F when the read head is actuated for reading magnetic data during prewind, with resumption of electrical drive after the data heas been read. As indicated in FIG. 5, the electric motor and drive circuit can be configured to pulse the motor for intermittent operation, if desired. FIG. 6 shows a flow diagram of the procedure, modified so that the stored spring energy is employed to complete the entire remainder of the prewind, once the read operation is begun, not just a couple of frames.

It will be appreciated by those skilled in the art to which the invention relates that while the foregoing illustrative description has dealt primarily with removal of potential electromagnetic interference form an electric drive motor during a read cycle involving detection by a read head 25 of prerecorded film-resident magnetic data, the same principles can be applied for removing the electric motor as a source of electromagnetic interference in a camera having a write head, during a write operation. For example, where information relating to a particular exposure is to be recorded magnetically adjacent an exposed frame as the film F is advanced to the next unexposed frame, the foregoing principles can be employed to disengage the electric motor until the write cycle is completed. It will also be appreciated that other substitutions and modifications can be made to the described embodiment without departing from the spirit and scope of the invention as described by the claims below.

What is claimed is:

1. A camera having a lightproof body; means defining an exposure plane within said body; means, including an electric drive motor, for transporting a strip of film in a direction along said plane under action of said motor; and magnetic interaction means for reading or writing data magnetically recorded on said film as said film is transported in said direction; said camera being characterized in that:
    said means for transporting includes means, responsive to operation of said motor, for storing mechanical energy; and
    said camera further comprises means, responsive to actuation of said magnetic interaction means during transport of said film in said direction under action of said motor, for disconnecting said motor and for continuing said transport under action of release of the mechanical energy stored responsive to operation of said motor.

2. A camera as in claim 1, further characterized in that said means for storing mechanical energy comprises a spring and means for winding said spring under action of said electric drive motor; and said means for disconnecting and continuing comprises means for turning said motor off and continuing said transport under unwinding action of said spring.

3. A camera as in claim 2, further characterized in that said motor includes a drive shaft; said means for transporting includes a first gear connected to be driven by said shaft and a gear train connected to be driven by said first gear; said means for winding said spring includes means for winding said spring by said shaft; and said means for disconnecting and continuing comprises a second gear connected to be driven by the unwinding action of said spring, and means for enabling said unwinding action and for driving said gear train by said second gear rather than said first gear when said motor is turned off.

4. A camera as in claim 3, further characterized in that said means for winding said spring includes overtorque protection means for limiting the amount of winding of said spring.

5. A camera as in claim 3, further characterized in that said means for driving said gear train by said second gear rather than said first gear comprises a swing arm, a third gear mounted on said swing arm, and means for moving said swing arm from a first position wherein said third gear is out of mesh with said gear train to a second position wherein said third gear is in mesh with both said second position and said gear train.

6. A camera as in claim 5, further characterized in that said means for driving said gear train by said second gear rather than said first gear further comprises means biasing said swing arm into said second position, means for releasably locking said swing arm in said first position against the bias of said biasing means, and means for releasing said locking means when said motor is turned off.

7. A camera as in claim 6, further characterized in that said locking means comprises a latch arm having a proximal end configured to contact said swing arm to latch said swing arm into said first position; and said releasing means comprises means for moving said latch arm out of contact with said swing arm.

8. A camera as in claim 7, further characterized in that said latch arm has a distal end including a slug of ferromagnetic material; said locking means further comprises means for biasing said latch arm proximal end into contact with said swing arm; and said releasing means comprises solenoid means for moving said slug to move said latch arm against the bias of said latch arm biasing means.

9. A camera as in claim 5, further characterized in that said electric drive motor comprises a bidirectional drive motor; said swing arm is a first swing arm; said gear train comprises fourth and fifth gears; and said camera further comprises means for selectively moving said drive shaft in first or second rotational directions, a second swing arm, a sixth gear mounted on said second swing arm, and means which is responsive to motion of said drive shaft in said first rotational direction for moving said second swing arm into a first position wherein said sixth gear is in mesh with said first and fourth gears to drive said gear train to transport said film in said direction and which is responsive to motion of said drive shaft in said second rotational direction for moving said second swing arm into a second position wherein said sixth gear is in mesh with said first and fifth gears to drive said gear train to transport said film opposite to said direction.

10. A camera as in claim 1, further characterized in that said camera has circuitry, including a microcomputer, for controlling operation of said motor and operation of said means for disconnecting and continuing.

11. A camera having a lightproof body; means defining an exposure station within said body; a motorized film transport mechanism, including an electric motor having a rotary drive shaft, for prewinding a strip of film from a supply reel onto a take-up reel in a prewind direction across said exposure station, under action of rotation of said drive shaft, for a length of said film until a next desired unexposed frame is brought into alignment with said exposure station; and means, including a magnetic read head, for reading data magnetically prerecorded on said film as said film is transported in said prewind direction; said camera being characterized in that:

said transport mechanism includes means for storing mechanical energy in response to rotation of said drive shaft; and said camera further comprises means, responsive to actuation of said read head during prewind of said film in said prewind direction under action of said drive shaft, for turning off said motor and for continuing said prewind, at least while said read head is engaged in reading said magnetically prerecorded data, under action of release of the mechanical energy stored in response to rotation of said drive shaft.

12. A camera as in claim 11, further characterized in that said means for turning off and continuing comprises means for turning off said motor and for continuing said prewind under action of release of said stored mechanical energy for the rest of said prewinding of said length.

13. A camera as in claim 11, further characterized in that said means for storing mechanical energy comprises a spring and means for winding said spring by rotation of said shaft; and said means for turning off and continuing comprises means for turning off said motor and for continuing said prewind under unwinding action of said spring.

14. A camera as in claim 13, further characterized in that said transport mechanism further includes a first gear mounted for rotation with said shaft; a gear train connected to be driven by said first gear; a second gear ;and mean connecting said spring between said first and second gears; and said means for turning off and continuing comprises means for driving said gear train by said second gear rather than said first gear when said motor is turned off.

15. A camera as in claim 14, further characterized in that said means connecting said spring between said first and second gears comprises overtorque protection means for limiting the amount of winding of said spring.

16. A method for transporting a strip of film in a direction along an exposure plane in a camera having a motorized film transport mechanism, including an electric drive motor, and magnetic interaction means for reading or writing data magnetically recorded on said film as said film is transported in said direction; said method comprising:

transporting said film in said direction under action of said motor;

storing mechanical energy in response to said action of said motor;

actuating said magnetic interaction means during said transporting of said film in said direction by said motor;

disconnecting said motor in response to said actuation of said magnetic interaction means; and continuing to transport said film in said direction, after disconnection of said motor, under action of release of said mechanical energy stored in said storing step.

17. A method as in claim 16, wherein said method is a method for transporting said strip of film by prewinding said strip in a prewind direction for a length of film until a next desired unexposed frame is brought into alignment with an exposure station, said film having data magnetically prerecorded thereon; said magnetic interaction means includes a magnetic read head; said transporting step comprises prewinding said film in said prewind direction under said action of said motor; said actuating step comprises actuating said magnetic read head during said prewinding under said action of said motor, to read said magnetically prerecorded data; said disconnecting step comprises turning said motor off in response to said actuating of said magnetic read head; and said continuing step comprises continuing to prewind said film in said prewind direction, at least while said read head is engaged in reading said data, under said action of said release of said mechanical energy stored in said storing step.

18. A method as in claim 17, wherein said continuing to prewind proceeds under said action of said release of said stored mechanical energy until all of said length is prewound.

19. A method as in claim 18, wherein said storing step comprises storing said mechanical energy by winding a spring under said action of said motor; and said continuing to prewind occurs under unwinding action of said spring.

20. A method as in claim 19, wherein said motor includes a drive shaft; said transport mechanism further includes a first gear mounted for rotation with said shaft, a gear train connected to be driven by said first gear, a second gear, and means connecting said spring between said first and second gears; said prewind under action of said motor further comprises driving said gear train by said first gear; and said continuing to prewind further comprises driving said gear train by said second gear.

* * * * *